United States Patent
Andersen et al.

(10) Patent No.: US 7,116,619 B2
(45) Date of Patent: Oct. 3, 2006

(54) OPTICAL DISC DRIVE APPARATUS, METHOD FOR MEASURING TILT OF AN OPTICAL DISC, AND METHOD FOR CORRECTING TILT OF AN OPTICAL DISC

(75) Inventors: Ole Klembt Andersen, Eindhoven (NL); Jacobus M. Den Hollander, Eindhoven (NL)

(73) Assignee: Koninklijke Philips Elelctronics N.V., Eindhoven (NL)

( * ) Notice: Subject to any disclaimer, the term of this patent is extended or adjusted under 35 U.S.C. 154(b) by 65 days.

(21) Appl. No.: 10/521,867

(22) PCT Filed: Jun. 26, 2003

(86) PCT No.: PCT/IB03/02810

§ 371 (c)(1),
(2), (4) Date: Jan. 21, 2005

(87) PCT Pub. No.: WO2004/015700

PCT Pub. Date: Feb. 19, 2004

(65) Prior Publication Data

US 2005/0265192 A1    Dec. 1, 2005

(30) Foreign Application Priority Data

Jul. 26, 2002    (EP)    .................................. 02078075

(51) Int. Cl.
*G11B 7/00*    (2006.01)

(52) U.S. Cl. ................. 369/53.19; 369/44.32; 720/674; 720/675

(58) Field of Classification Search ............. 369/53.19, 369/44.32; 720/674, 675
See application file for complete search history.

(56) References Cited

U.S. PATENT DOCUMENTS

| | | | |
|---|---|---|---|
| 5,001,690 A | * | 3/1991 | Kamiya et al. ........... 369/44.32 |
| 5,322,993 A | * | 6/1994 | Ohyama ..................... 369/118 |
| 2003/0161232 A1 | * | 8/2003 | Yoshimoto ............... 369/44.32 |
| 2004/0042356 A1 | * | 3/2004 | Kato et al. ................ 369/44.32 |
| 2004/0125711 A1 | * | 7/2004 | Sato et al. ................ 369/44.32 |
| 2005/0078574 A1 | * | 4/2005 | Wada et al. ............. 369/44.32 |

FOREIGN PATENT DOCUMENTS

JP    2002342963    *    5/2001

* cited by examiner

*Primary Examiner*—Andrea Wellington
*Assistant Examiner*—Linh T. Nguyen
(74) *Attorney, Agent, or Firm*—Michael E. Belk

(57) ABSTRACT

Tilt ($\theta(r, \phi)$) is measured in a measuring location ($P(r, \phi)$) optical disc (2). A pivotable objective lens (34) is brought to a first focus measuring location such as to focus a light beam (32) in a first anchor point ($P1(r-\Delta r1, \phi)$) having the same angular coordinate $\phi$ as said measuring location ($P(r, \phi)$) and having a small radial distance $\Delta r1$ from said measuring location. The objective lens is brought to a second focus measuring location such as to focus the light beam in a second anchor point ($P2(r+\Delta r2, \phi)$) having the same angular coordinate $\phi$ as said measuring location and having a small radial distance $\Delta r2$ from said measuring location, wherein said first and second anchor pints are located on opposite sides of said measuring location. Tilt in said measuring location is calculated from the coordinates of said two focus measuring locations of said objective lens.

21 Claims, 7 Drawing Sheets

Figure 1:
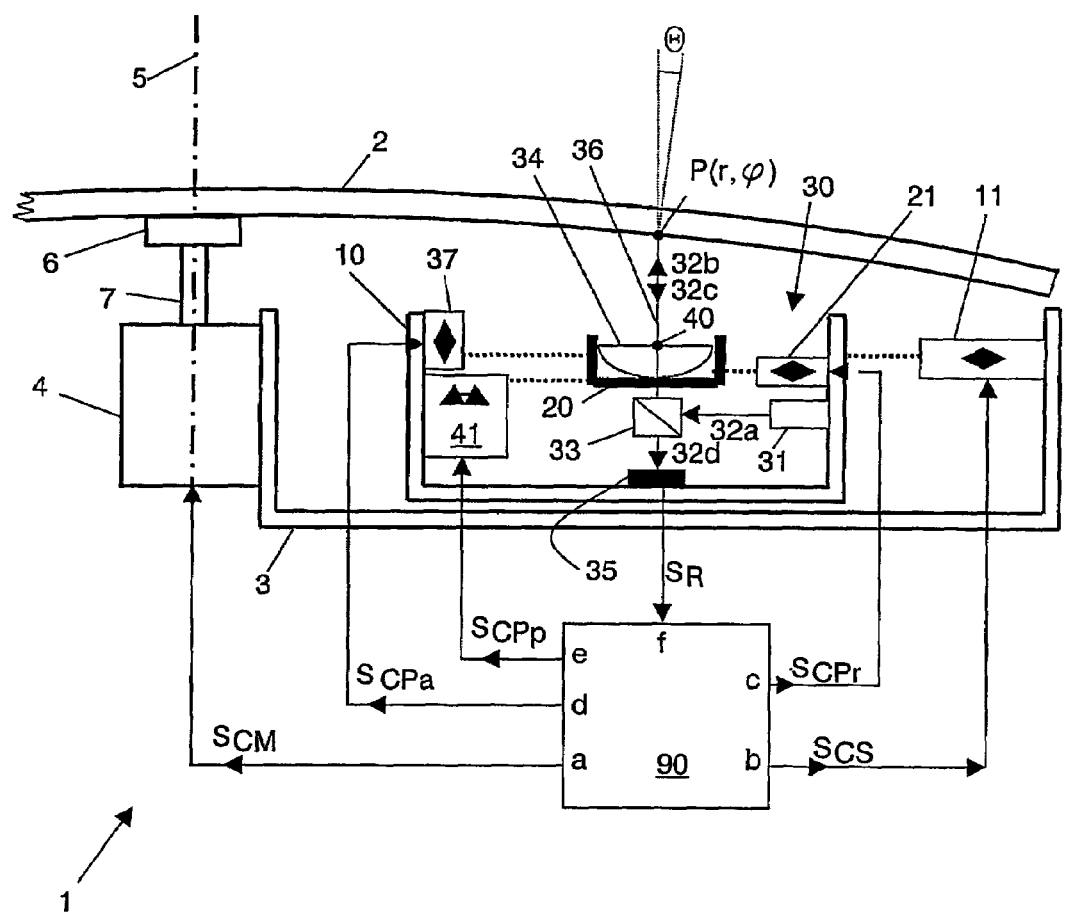

$$\tan\theta = \frac{\Delta Z_1 + \Delta Z_2}{f\sin\Delta\psi_1 + f\sin\Delta\psi_2}$$

$$\tan\theta = \frac{Z_1 - Z_2}{X_2 - X_1}$$

$$\tan\theta = \frac{\Delta Z_1 + \Delta Z_2}{f\sin\Delta\psi_1 + f\sin\Delta\psi_2}$$

$$\tan\theta = \frac{\cos\Delta\psi_1 - \cos\Delta\psi_2}{\sin\Delta\psi_1 + \sin\Delta\psi_2}$$

OPTICAL DISC DRIVE APPARATUS, METHOD FOR MEASURING TILT OF AN OPTICAL DISC, AND METHOD FOR CORRECTING TILT OF AN OPTICAL DISC

The present invention relates in general to disc drive systems for storing information onto a disc-shaped storage medium or reading information from such disc-shaped storage medium, where the disc is rotated and a write/read head is moved radially with respect to the rotating disc. The present invention is applicable in the case of optical or magneto-optical disc systems. Hereinafter, the wording "optical disc system" will be used, but it is to be understood that this wording is intended to also cover magneto-optical disc systems.

As is commonly known, an optical storage disc comprises at least one track, either in the form of a continuous spiral or in the form of multiple concentric circles, of storage space where information may be stored. Optical discs may be read-only type, where information is recorded during manufacture, which data can only be read by a user. The optical storage disc may also be a writable type, where information may be stored by a user. For writing information in the storage space of the optical storage disc, or for reading information from the disc, an optical disc drive comprises, on the one hand, rotating means for receiving and rotating an optical disc, and on the other hand optical means for generating an optical beam, typically a laser beam, and for scanning the storage track with said laser beam. Since the technology of optical discs in general, the way in which information can be stored in an optical disc, and the way in which optical data can be read from an optical disc, is commonly known, it is not necessary here to describe this technology in more detail.

For rotating the optical disc, an optical disc drive typically comprises a motor, which drives a hub engaging a central portion of the optical disc. Usually, the motor is implemented as a spindle motor, and the motor-driven hub may be arranged directly on the spindle axle of the motor.

For optically scanning the rotating disc, an optical disc drive comprises a light beam generator device (typically a laser diode), an objective lens for focussing the light beam in a focal spot on the disc, and an optical detector for receiving the reflected light reflected from the disc and for generating an electrical detector output signal.

During operation, the light beam should remain focussed on the disc. To this end, the objective lens is arranged axially displaceable, and the optical disc drive comprises focal actuator means for controlling the axial position of the objective lens. Further, the focal spot should remain aligned with a track or should be capable of being positioned with respect to a new track. To this end, at least the objective lens is mounted radially displaceable, and the optical disc drive comprises radial actuator means for controlling the radial position of the objective lens.

More particularly, the optical disc drive comprises a sledge which is displaceably guided with respect to a disc drive frame, which frame also carries the spindle motor for rotating the disc. The travel course of the sledge is arranged substantially radially with respect to the disc, and the sledge can be displaced over a range substantially corresponding to the range from inner track radius to outer track radius. Said radial actuator means comprise a controllable sledge drive, for instance comprising a linear motor, a stepper motor, or a worm gear motor.

The displacement of the sledge is intended for roughly positioning the optical lens. For fine-tuning the position of the optical lens, the optical disc drive comprises a lens platform which carries the objective lens and which is displaceably mounted with respect to said sledge. The displacement range of the platform with respect to the sledge is relatively small, but the positioning accuracy of the platform with respect to the sledge is larger than the positioning accuracy of the sledge with respect to the frame.

In many disc drives, the orientation of the objective lens is fixed, i.e. its axis is directed parallel to the rotation axis of the disc. In some disc drives, the objective lens is pivotably mounted, such that its axis can make an angle with the rotation axis of the disc. Usually, this is implemented by making the platform pivotable with respect to the sledge.

It is a general desire to increase the storage capacity of a record medium. One way of fulfilling this desire is to increase the storage density; to this end, optical scanning systems have been developed wherein the objective lens has a relatively high numerical aperture (NA). One problem involved in such optical systems is the increased sensitivity to tilt of the optical disc. Tilt of the optical disc can be defined as a situation where the storage layer of the optical disc, at the location of the focal spot, is not exactly perpendicular to the rotation axis. Tilt can be caused by the optical disc being tilted as a whole, but is usually caused by the optical disc being warped, and as a consequence the amount of tilt depends on the location on disc.

Thus, there is a demand for a compensation system, and for a method to measure tilt.

It is possible to measure the tilt with a separate tilt sensor. However, such solution would involve additional hardware and increased costs.

The present invention proposes a tilt measuring method which does not need a separate tilt sensor. For measuring the tilt in a certain location of the optical disc, this measuring location being characterized by a certain radial coordinate and a certain angular coordinate, the optical beam is used to obtain the coordinates of two locations on opposite sites of the measuring location, located along the same radial line as the measuring location, i.e. having the same angular coordinate as the measuring location. The tilt angle at the measuring location is calculated from the relative axial distance and the relative radial distance between said two opposite locations.

The coordinates of said locations on opposite sites of the measuring location, which will be indicated as "anchor locations", are obtained by focusing the optical beam in such anchor locations. In a known method in accordance with this principle, the focus point of the optical beam is brought to such anchor locations by displacing the objective lens radially and axially. It is a main objective of the present invention to provide an alternative to this known method.

A disadvantage of said known method is associated with the fact that the objective lens is brought to a different radial position. Thus, if the method is performed while the apparatus is reading or writing a track, the objective lens necessarily looses its original track position and must be radially displaced back to its original radial position before the apparatus can resume operation. It is a further objective of the present invention to overcome this disadvantage.

The present invention is based on the understanding that the radial coordinate of the focal point of the optical beam is displaced radially when the objective lens is pivoted. Based on this understanding, in an optical disc drive of a type where the optical lens can be pivoted, the measuring method according to the present invention is performed by displacing the optical lens in axial direction and in pivot direction. In one embodiment, the method is performed by first focusing the optical beam on the measuring location, moving the objective lens axially towards the optical disc, and pivoting the objective lens into two directions to obtain two focal locations. In an alternative embodiment, the optical beam is first focused at the measuring location, then the objective lens is pivoted into one direction followed by the objective lens being axially displaced towards the optical disc.

Further, a disadvantage of the known method is that it is restricted to finding a value for the tilt in a certain location. This value will be used as input in a device for correcting the tilt. In an optical disc drive of a type where the optical lens can be pivoted, the corrective action may consist in giving the optical lens a suitable pivot offset, i.e. pivoting the optical lens over a suitable pivot angle. One way of finding the appropriate pivot offset is to calculate a pivot angle on the basis of the measured tilt. Such calculation may, however, introduce errors, especially if circumstances like temperature change, and merely calculating a pivot angle does not offer any feedback mechanism which enables a check as to whether the calculated pivot angle is the optimal angle.

The present invention also aims to provide a solution to this problem. More particularly, the present invention aims to provide a method for setting the pivot offset of the objective lens such that a tilt of the disc is corrected as good as possible, without the need to know the size of the tilt. In one embodiment, the method for setting the pivot offset of the objective lens is performed by setting the pivot offset to a certain value, then focusing the optical beam on the measuring location, moving the objective lens axially towards the optical disc, and pivoting the objective lens into two directions to obtain two focal locations. If the two pivot angles are equal, the pivot offset is assumed to be correct. If not, the pivot offset is amended, and the above steps are repeated.

In an alternative embodiment, the pivot offset of the objective lens is set to a certain value, the optical beam is focused at the measuring location, then the objective lens is pivoted into one direction followed by the objective lens being axially displaced towards the optical disc. Then, the objective lens is pivoted into the opposite direction over the same angle followed by the objective lens being axially displaced towards the optical disc. If the two axial displacements are equal, the pivot offset is assumed to be correct. If not, the pivot offset is amended, and the above steps are repeated.

Figure 2:
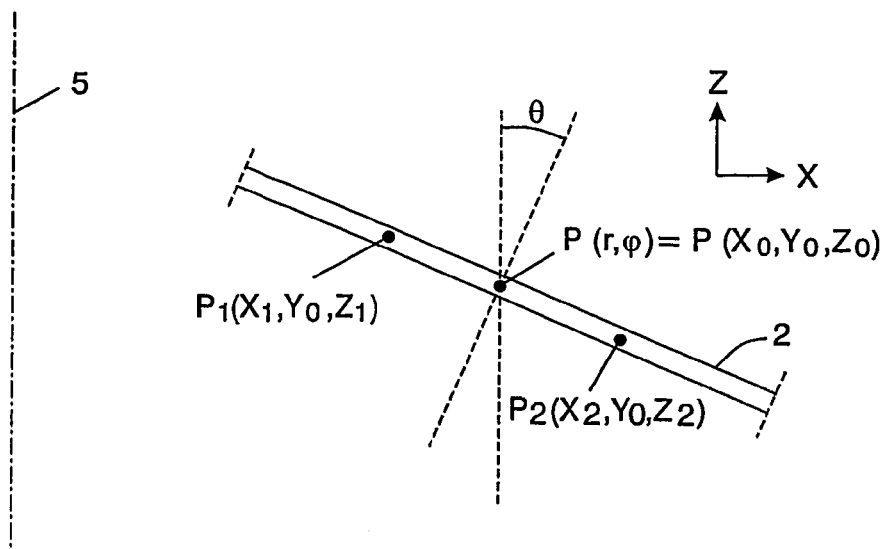
Figure 3:
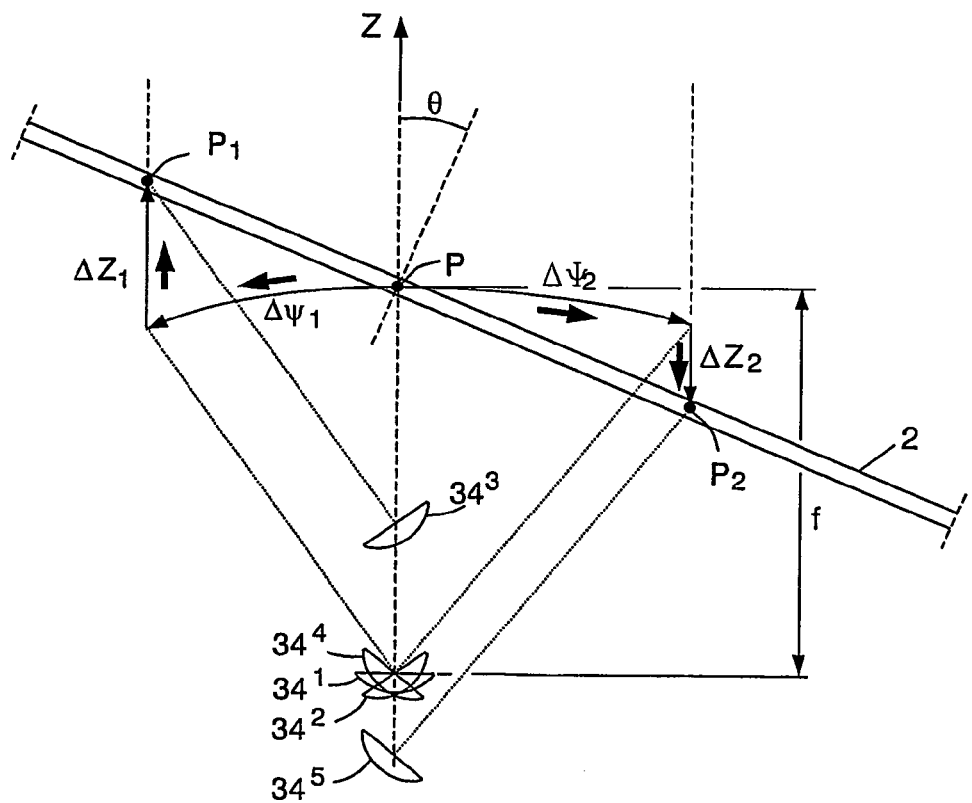
Figure 4:
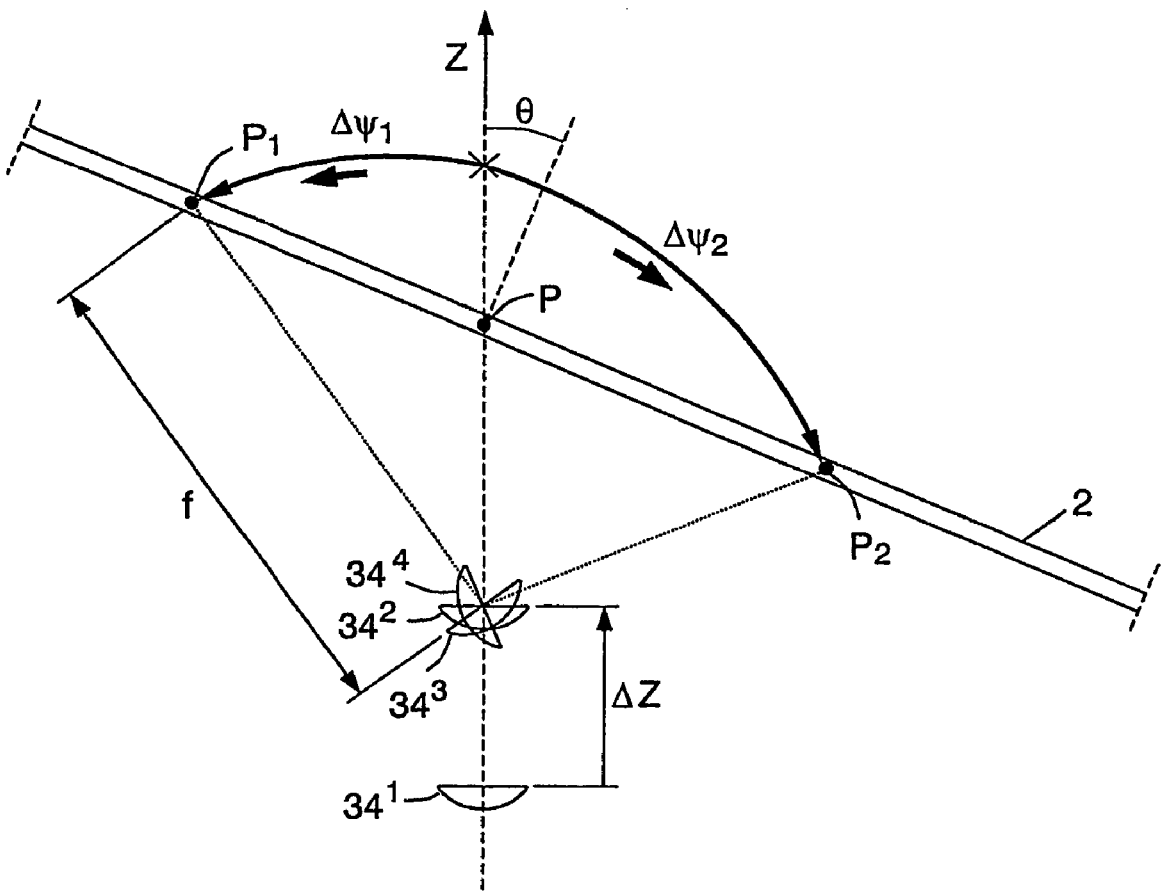
Figure 5A:
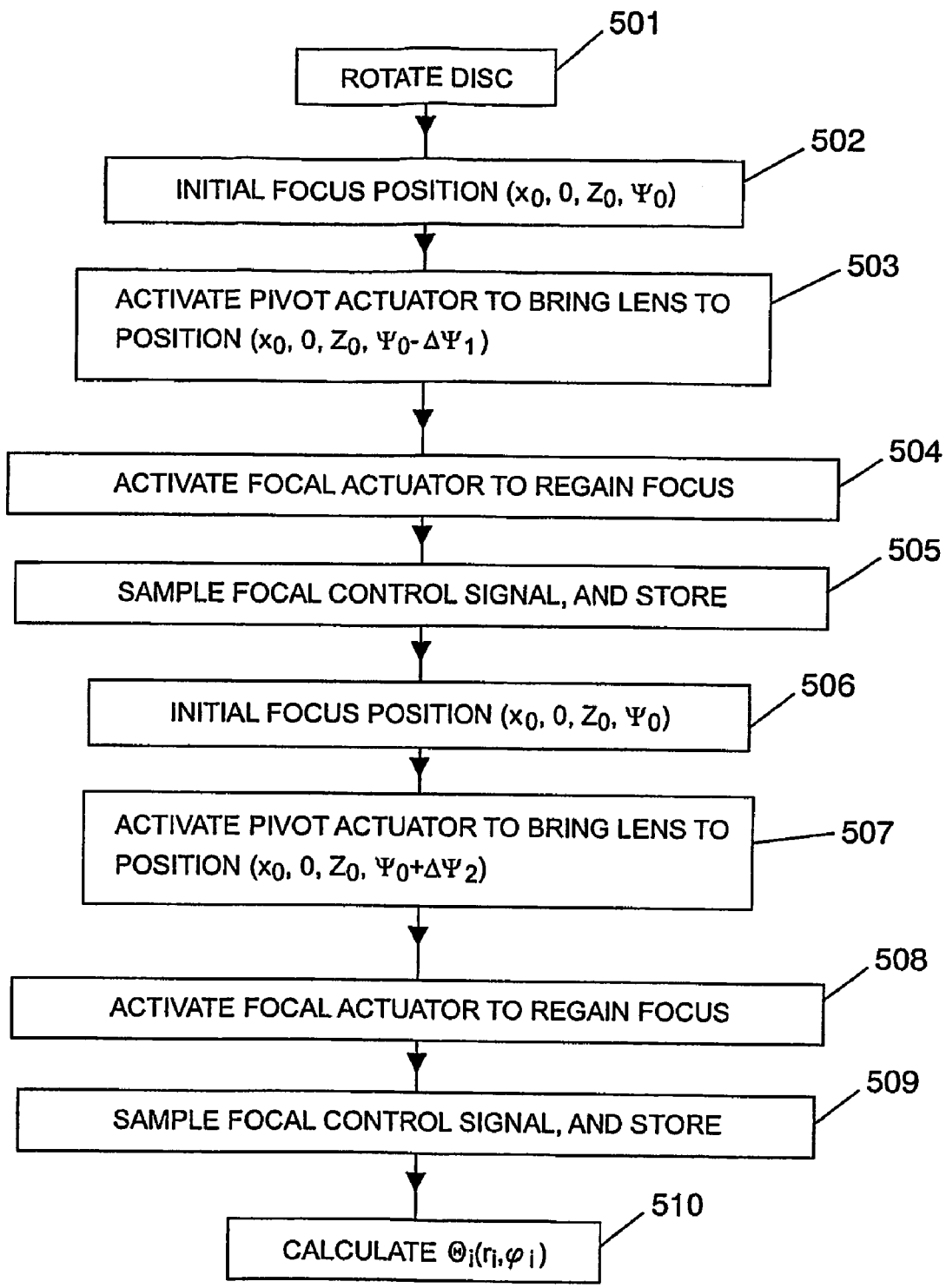
Figure 5B:
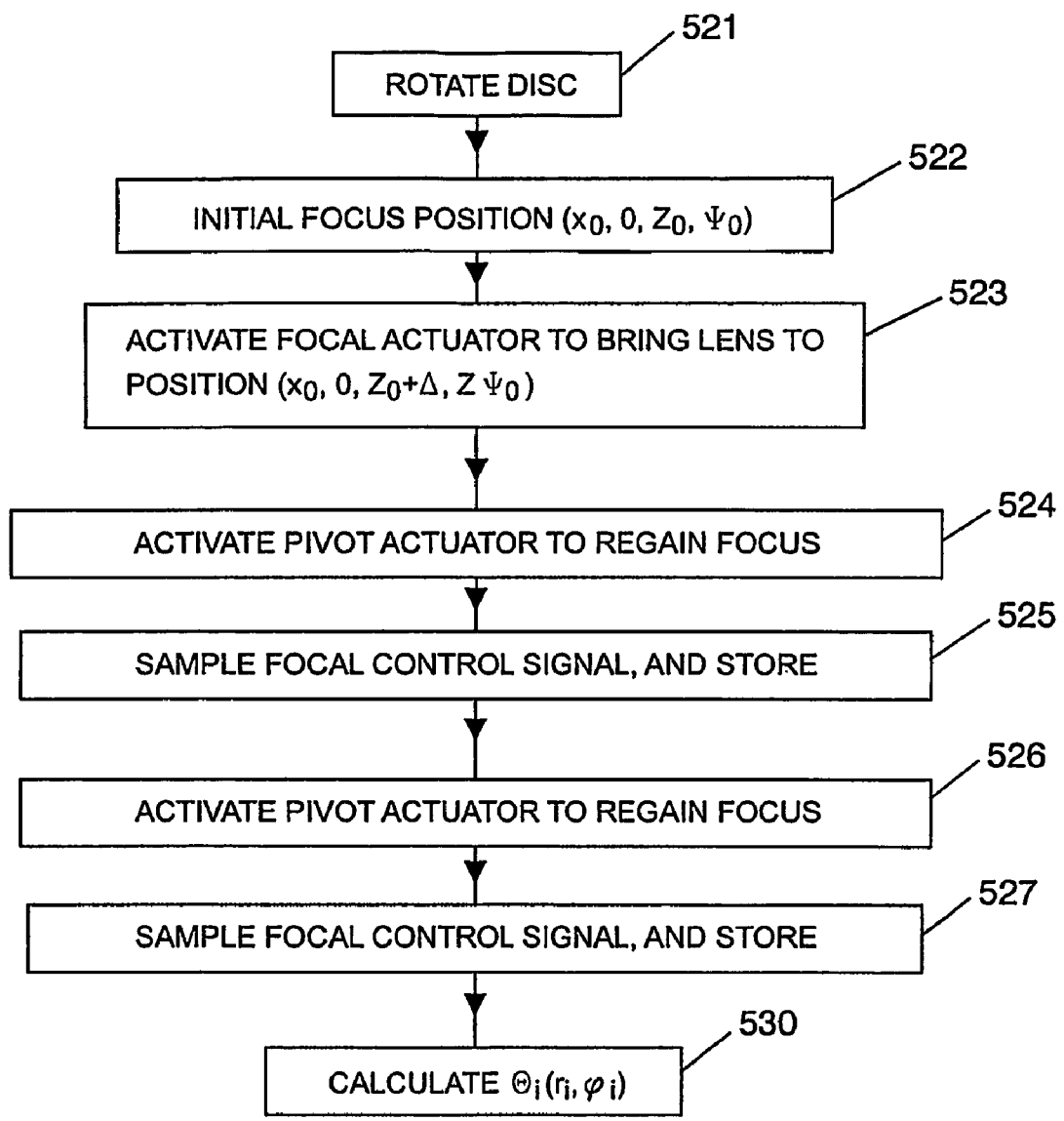
Figure 6A:
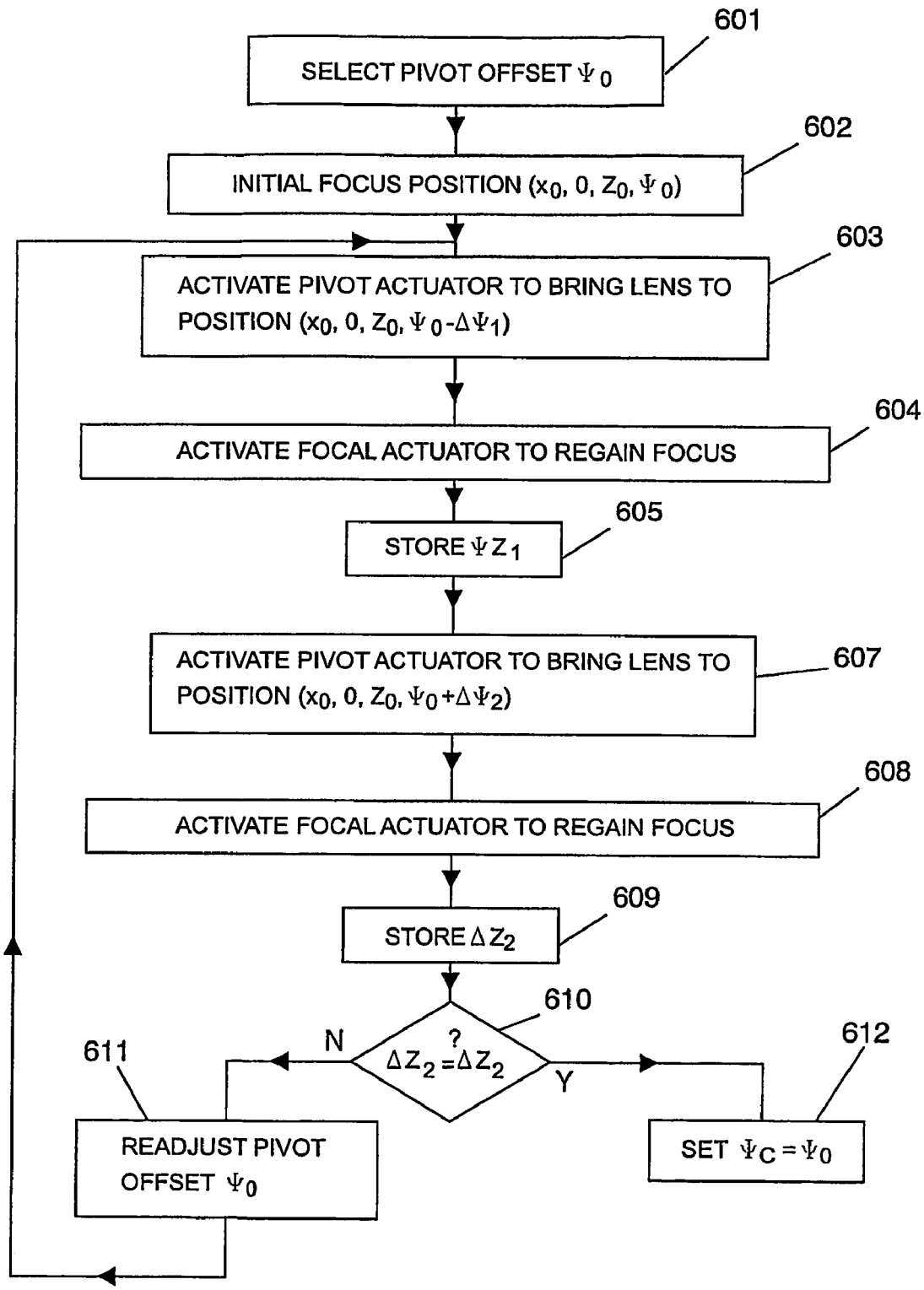
Figure 6B:
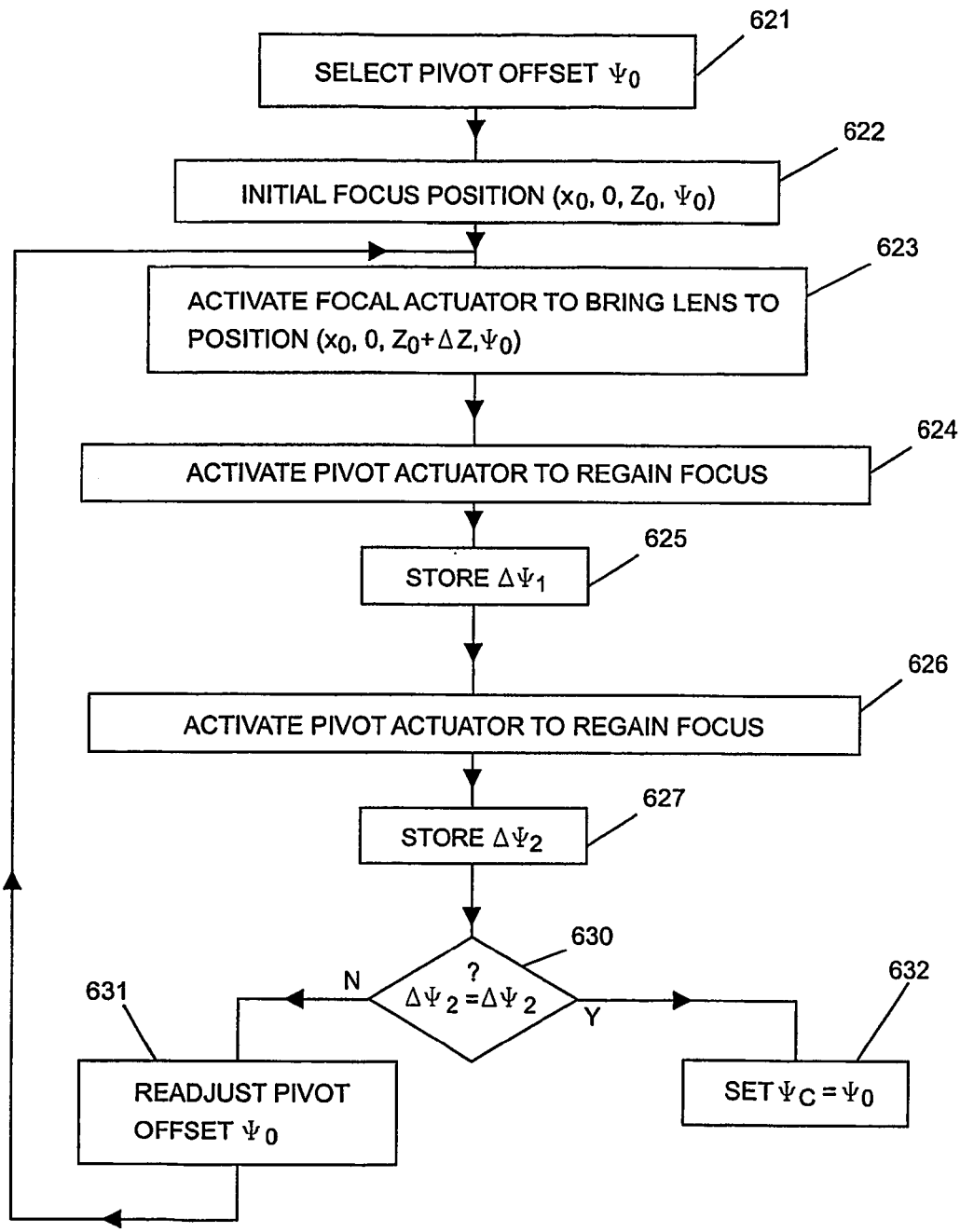

These and other aspects, features and advantages of the present invention will be further explained by the following description with reference to the drawings, in which same reference numerals indicate same or similar parts, and in which:

FIG. 1 schematically shows a disc drive apparatus;

FIGS. 2–4 schematically illustrate embodiments of the measuring method of the present invention;

FIGS. 5A–B are flow charts illustrating steps of disc tilt measuring methods of the present invention;

FIGS. 6A–B are flow charts illustrating steps of pivot angle setting methods of the present invention.

FIG. 1 schematically illustrates an optical disc drive 1, suitable for storing information on or reading information from an optical disc 2. The disc drive apparatus 1 comprises an apparatus frame 3. For rotating the disc 2, the disc drive apparatus 1 comprises a motor 4 fixed to the frame 3, defining a rotation axis 5. For receiving and holding the disc 2, the disc drive apparatus 1 may comprise a turntable or clamping hub 6, which in the case of a spindle motor 4 is mounted on the spindle axle 7 of the motor 4.

The disc drive apparatus 1 further comprises a displaceable sledge 10, which is displaceably guided in the radial direction of the disc 2, i.e. in a direction substantially perpendicular to the rotation axis 5, by guiding means not shown for the sake of clarity. A radial sledge actuator, designed for regulating the radial position of the sledge 10 with respect to the apparatus frame 3, is schematically indicated at 11. Since radial sledge actuators are known per se, while the present invention does not relate to the design and functioning of such radial sledge actuator, it is not necessary here to discuss the design and functioning of a radial sledge actuator in great detail.

In the following, the rotation axis 5 will be taken as Z-axis. Associated with the apparatus 1, a rectangular coordinate system XYZ will be used, wherein the displacement direction of the sledge 10 will be taken as X-axis, whereas an Y-axis is defined perpendicular to the X-axis and the Z-axis. Associated with the disc 2, a polar coordinate system r, $\phi$ will be used.

The disc drive apparatus 1 further comprises a displaceable platform 20, which is displaceable in the radial direction of the disc 2 with respect to the sledge 10, and which is displaceably mounted with respect to the sledge 10 by mounting means not shown for the sake of clarity. A radial platform actuator arranged for radially displacing the platform 20 with respect to the sledge 10, is indicated at 21. Since such radial platform actuators are known per se, while further the design and operation of such radial platform actuator is no subject of the present invention, it is not necessary here to discuss the design and operation of such radial platform actuator in great detail.

The disc drive apparatus 1 further comprises an optical system 30 for scanning tracks (not shown) of the disc 2 by an optical beam. More specifically, the optical system 30 comprises a light beam generating means 31, typically a laser such as a laser diode, which may be mounted with respect to the apparatus frame 3 or the sledge 10, and which is arranged to generate a light beam 32a which passes a beam splitter 33 and an objective lens 34 carried by the platform 20. The objective lens 34 focuses the light beam 32b on the disc 2. For achieving an maintaining a correct focusing of the light beam 32b, exactly on the desired location of the disc 2, said platform 20 is also mounted axially displaceable (Z-direction) with respect to the sledge 10, while further the disc drive apparatus 1 also comprises an axial platform actuator 37 arranged for axially displacing the platform 20 with respect to the sledge 10. Since such axial platform actuators are known per se, while further the design and operation of such axial platform actuator is no subject of the present invention, it is not necessary here to discuss the design and operation of such axial platform actuator in great detail.

Said objective lens is mounted pivotably with respect to the apparatus frame 3. In an exemplary embodiment, this is achieved by said platform 20 being mounted pivotably with respect to the sledge 10 by mounting means not shown for the sake of clarity. The platform 20 can pivot about a pivot axis 40 which is directed parallel to the Y-axis, such that an optical axis 36 of the objective lens 34 is always located in the XZ-plane. Preferably, as illustrated, the pivot axis 40 coincides with the optical centre of the objective lens 34. A pivot angle ($\psi$) will be defined as the angle between the Z-axis and the optical axis 36 of the objective lens 34. Since pivotably mounted platforms are known per se, while further the design and operation of such pivotably mounted platforms is no subject of the present invention, it is not necessary here to discuss the design and operation of such pivotably mounted platform in great detail.

Further, the disc drive apparatus 1 also comprises a pivot platform actuator 41 arranged for pivoting the platform 20 with respect to the sledge 10. Since such pivot platform actuators are known per se, while further the design and operation of such pivot platform actuator is no subject of the present invention, it is not necessary here to discuss the design and operation of such pivot platform actuator in great detail.

The disc drive apparatus 1 further comprises a control unit 90 having a first output 90a connected to a control input of the motor 4, having a second output 90b coupled to a control input of the radial sledge actuator 11, having a third output 90c coupled to a control input of the radial platform actuator 21, having a fourth output 90d coupled to a control input of the axial platform actuator 37, and having a fifth output 90e coupled to a control input of the pivot platform actuator 41. The control unit 90 is designed to generate at its first output 90a a control signal $S_{CM}$ for controlling the motor 4, to generate at its second control output 90b a control signal $S_{CS}$ for controlling the sledge actuator 11, to generate at its third output 90c a control signal $S_{CPr}$ for controlling the radial platform actuator 21, to generate at its fourth output 90d a control signal $S_{CPa}$ for controlling the axial platform actuator 37, and to generate at its fifth output 90e a control signal $S_{CPp}$ for controlling the pivot platform actuator 41.

The light beam 32b reflects from the disc 2 (reflected light beam 32c) and passes the objective lens 34 and the beam splitter 33 (beam 32d) to reach an optical detector 35 mounted with respect to the sledge 10. The control unit 90 further has a read signal input 90f for receiving a read signal $S_R$ from the optical detector 35. As will be clear to a person skilled in the art without needing further explanation, the read signal $S_R$ contains information relating to the fact whether or not the optical beam 32b is accurately focused on the optical disc 2. More particularly, a focal error signal (FES) can be derived from the read signal $S_R$.

A point P is shown, having polar coordinates r and $\phi$. In an ideal case, the normal to the surface in point $P(r,\phi))$ is exactly parallel to the Z-axis, but in the case where the disc 2 has a warped surface, as shown, the normal in point $P(r,\phi))$ makes an angle $\theta(r,\phi)$ with the Z-axis. This angle $\theta(r,\phi)$ will be taken as measure of the tilt in point $P(r,\phi)$. The tilt may vary over the surface of the disc, in other words the tilt $\theta(r,\phi)$ is a function of radial coordinate r and angular coordinate $\phi$. It is desirable to know $\theta(r,\phi)$ for an entire disc, or at least for that part of the disc which is to be accessed.

FIG. 2 schematically illustrates the basic principle underlying the measuring method proposed by the present invention. On a radial line through point $P(r,\phi)$, two points P1 and P2 of the disc 2 are shown on opposite sides of point P. In the polar coordinate system of the disc, these two points P1 and P2 have coordinates $(r_1,\phi)$ and $(r_2,\phi)$, respectively. In the rectangular coordinate system of the disc drive 1, the points P, P1 and P2 have coordinates (X0,Y0,Z0), (X1,Y0,Z1), (X2,Y0,Z2), respectively. It can easily be seen that the tilt $\theta(r,\phi)$ in point $P(r,\phi)$ can be expressed by the following formula:

$$\tan\theta(r,\phi)=(Z1-Z2)/(X2-X1)$$

In the following, the location $P(r,\phi)$ where the tilt is to be measured will be indicated as measuring location. Said two points P1 and P2 on opposite sides of the measuring location will be indicated as anchor points.

The present invention is based on finding, with respect to a measuring location, two anchor points P1 and P2, and measuring the relative radial distance X2–X1 and the relative axial distance Z1–Z2 between these anchor points P1 and P2. As soon as this information is available, the tilt $\theta$ at the measuring location can be calculated.

FIG. 3 illustrates a first implementation of the above-mentioned basic measuring principle.

In a first step, the objective lens 34 is brought to an initial focus position (indicated as 34[1] in the drawing) where the focal spot of the light beam 32 coincides with measuring location $P(r,\phi)$. The coordinates $(z,y,z,\psi)$ of the objective lens 34 in this initial focus position are defined as $(x_0,0,z_0,\psi_0)$ (since the objective lens can not move in the Y-direction, its Y-coordinate is always constant and maybe taken as zero). In the XYZ-coordinate system, the coordinates of the measuring location $P(r,\phi)$ are $(x_0,0,z_p)$. The distance $z_p$-$z_0$ corresponds to the focal distance f of the objective lens, which is taken to be constant.

In a second step, the objective lens 34 is pivoted over a first angle $\Delta\psi_1$ towards smaller radius, to reach a position (34[2]) having coordinates $(x_0,0,z_0,\psi_0-\Delta\psi_1)$. By such step, the beam is now out of focus. Focus is regained by, in a third step, displacing the objective lens 34 axially until the control unit 90 finds that the optical beam 32 is again focused on the disc 2. Depending on the amount of tilt of the disc 2, this will require a certain axial displacement $\Delta z_1$, so that the objective lens 34 has reached a first focus measuring position (34[3]) having coordinates $(x_0,0,z_0+\Delta z_1,\psi_0-\Delta\psi_1)$.

This implies that the first anchor point P1 has coordinates $(x_0-f\cdot\sin(\Delta\psi_1),0,z_0+f\cdot\cos(\Delta\psi_1)+\Delta z_1)$. The control unit 90 will store the magnitude $\Delta z_1$ of this axial displacement in a memory.

In a fourth step, the objective lens 34 is brought back to the initial focus position $(x_0,0,z_0,\psi_0)$.

In a fifth step, the objective lens 34 is pivoted over a second angle $\Delta\psi_2$ towards larger radius, to reach a position (34[4]) having coordinates $(x_0,0,z_0,\psi_0+\Delta\psi_2)$. In a sixth step, the objective lens 34 is displaced axially until the control unit 90 finds that the optical beam 32 is again focused on the disc 2. Depending on the amount of tilt of the disc 2, this will require a certain axial displacement $\Delta z_2$, so that the objective lens 34 has reached a second focus measuring position (34[5]) having coordinates $(x_0,0,z_0-\Delta z_2,\psi_0+\Delta\psi_2)$. This implies that the second anchor point P2 has coordinates $(x_0+f\cdot\sin(\Delta\psi_2),0,z_0+f\cdot\cos(\Delta\psi_2)-\Delta z_2)$. The control unit 90 will also store the magnitude $\Delta z_2$ of this axial displacement in a memory.

The control unit 90 can now calculate the tilt $\theta(r,\phi)$ of the measuring location $P(r,\phi)$ of the disc 2 from the values of f, $\Delta\psi_1$, $\Delta z_1$, $\Delta\psi_2$, $\Delta z_2$, according to the general formula:

$$\tan\theta(r,\phi)=(f\cdot\cos(\Delta\psi_1)+\Delta z_1-(f\cdot\cos(\Delta\psi_2)-\Delta z_2))/(f\cdot\sin(\Delta\psi_1)+f\cdot\sin(\Delta\psi_2))$$

Preferably, although not essentially, the first angle $\Delta\psi_1$ is equal to the second angle $\Delta\psi_2$. In that case, the above formula simplifies as follows:

$$\tan\theta(r,\phi)=(\Delta z_1+\Delta z_2)/(2f\cdot\sin(\Delta\psi_1))$$

For small values of $\Delta z_1$ and $\Delta z_2$, the above formula can be approximated as follows:

$$\tan\theta(r,\phi)=(\Delta z_1+\Delta z_2)/(2f\cdot\Delta\psi_1)$$

It is noted that the fourth step may be omitted.

It is further noted that the fifth and sixth steps may be taken before the second and third steps, so as to first reach the anchor location $P_2$ at larger radius and then reach the anchor location $P_1$ at smaller radius.

FIG. 4 illustrates a second implementation of the above-mentioned basic measuring principle.

In a first step, the objective lens 34 is brought to an initial focus position (indicated as $34^1$ in the drawing) where the focal spot of the light beam 32 coincides with measuring location $P(r,\phi)$. The coordinates $(z,y,z,\psi)$ of the objective lens 34 in this initial focus position are defined as $(x_0,0,z_0,\psi_0)$ (since the objective lens can not move in the Y-direction, its Y-coordinate is always constant and may be taken as zero). In the XYZ-coordinate system, the coordinates of the measuring location $P(r,\phi)$ are $(x_0,0,z_p)$. The distance $z_p-z_0$ corresponds to the focal distance f of the objective lens, which is taken to be constant.

In a second step, the objective lens 34 is axially displaced over a distance $\Delta z$ towards the disc, to reach a position ($34^2$) having coordinates $(x_0,0,z_0+\Delta z,\psi_0)$. By such step, the beam is now out of focus.

In a third step, the objective lens 34 is pivoted towards smaller radius until the control unit 90 finds that the optical beam 32 is again focused on the disc 2. Depending on the amount of tilt of the disc 2, this will require a certain first pivot angle $\Delta\psi_1$, so that the objective lens 34 has reached a first focus measuring position ($34^3$) having coordinates $(x_0,0,z_0+\Delta z,\psi_0-\Delta\psi_1)$.

This implies that the first anchor point P1 has coordinates $(x_0-f\cdot\sin(\Delta\psi_1),0,z_0+f\cdot\cos(\Delta\psi_1))$. The control unit 90 will store the magnitude $\Delta\psi_1$ of this first pivot angle in a memory.

In a fourth step, the objective lens 34 is pivoted towards larger radius until the control unit 90 finds that the optical beam 32 is again focused on the disc 2 in a second focus measuring position ($34^4$) having coordinates $(x_0,0,z_0+\Delta z, \psi_0+\Delta\psi_2)$.

This implies that the second anchor point P2 has coordinates $(x_0+f\cdot\sin(\Delta\psi_2),0,z_0+f\cdot\cos(\Delta\psi_2))$. The control unit 90 will also store the magnitude $\Delta\psi_2$ of this second pivot angle in a memory.

The control unit 90 can now calculate the tilt $\theta(r,\phi)$ of the measuring location $P(r,\phi)$ of the disc 2 from the values of $\Delta\psi_1$, $\Delta\psi_2$, $\Delta z$, according to the general formula:

$$\tan\theta(r,\phi)=(\cos(\Delta\psi_1)-\cos(\Delta\psi_2))/(\sin(\Delta\psi_1)+\sin(\Delta\psi_2))$$

For small values of $\Delta\psi_1$ and $\Delta\psi_2$, the above formula can be approximated as follows:

$$\tan\theta(r,\phi)=(\Delta\psi_1-\Delta\psi_2)/2$$

It is noted that the fourth step may be taken before the third step, so as to first reach the anchor location $P_2$ at larger radius and then reach the anchor location $P_1$ at smaller radius.

In the above, the tilt $\theta$ is expressed in terms of displacement $\Delta z$ and $\Delta\psi$. Normally, the control unit 90 does not have direct information regarding these parameters. Of course, it is possible to provide the control unit with sensors for measuring $\Delta z$ and $\Delta\psi$, respectively, but this is not preferred since it involves additional hardware and costs.

However, the control unit 90 has signals available representing said parameters $\Delta z$ and $\Delta\psi$. Generally, the displacement $\Delta z$ and $\Delta\psi$ established by the respective actuators is proportional to the respective control signal generated by the control unit 90, especially if said displacements are small. In those cases, the following relationships apply:

$$\Delta z=\gamma_Z\cdot S_{CPa}; \Delta\psi=\gamma_\psi\cdot S_{CPp}$$

wherein $\gamma_Z$, $\gamma_\psi$, are proportionality constants. Thus, the control unit 90 can calculate said displacements from its own control signals.

In the above, it is explained that the tilt $\theta(r,\phi)$ in one location $P(r,\phi)$ can be determined if the X-coordinates and the Z-coordinates of anchor points P1 and P2 are known. In principle, such measurements could be performed for one individual measuring point, keeping the optical disc 2 stationary. Normally, however, it is desired to determine the tilt $\theta(r,\phi)$ for a large number of values of r and $\phi$, i.e. over a large number of locations (or perhaps even over entire surface of the optical disc). This could be done by repeating the measuring method for each such location. However, this would be very impractical.

Therefore, in practice, the measuring method proposed by the present invention is preferably implemented by determining the tilt $\theta(R_i,\phi)$ over 360° at a certain radius $R_i$, i.e. for all points $P_j$ at a certain radius $R_i$, with a rotating disc. First, the objective lens is brought to an initial focus location at a certain radius $R_i$, corresponding to a certain X-coordinate. Then, for all anchor points $P_{1j}(R_i-\Delta r,\phi_j)$ at lower radius, the X-coordinates $X_{1j}(R_i-\Delta r,\phi_j)$ and the Z-coordinates $Z_{1j}(R_i-\Delta r,\phi_j)$ are determined and stored in a memory. Subsequently, for all anchor points $P_{2j}(R_i+\Delta r,\phi_j)$ at larger radius, the X-coordinates $X_{2j}(R_i+\Delta r,\phi_j)$ and the Z-coordinates $Z_{2j}(R_i+\Delta r,\phi_j)$ are determined and stored in a memory. Of course, the order may be reversed. Then, for each point $P_j(R_i,\phi_j)$ at this radius $R_i$, the tilt $\theta_j(R_i,\phi_j)$ can be calculated by combining the coordinates $X_{1j}(R_i-\Delta r,\phi_j)$, $X_{2j}(R_i+\Delta r,\phi_j)$, $Z_{1j}(R_i-\Delta r,\phi_j)$, $Z_{2j}(R_i+\Delta r,\phi_j)$ in the manner described earlier.

This can be repeated for different values of $R_i$, in order to obtain the tilt over the entire disc.

More particularly, the method will be explained in somewhat more detail for each of the above-described embodiments.

Referring to the first implementation explained above with reference to FIG. 3, and to the flow chart of FIG. 5A, the optical disc 2 is rotated (step 501) at a certain predetermined speed. Then, in a first step 502, the objective lens 34 is brought to an initial focus position ($34^1$) $(x_0,0,z_0,\psi_0)$ corresponding to measuring radius Ri.

In a second step 503, the pivot actuator 41 is activated such as to pivot the objective lens 34 over a first angle $\Delta\psi_1$ towards smaller radius, to reach a position ($34^2$) having coordinates $(x_0,0,z_0,\psi_0-\psi_1)$. In a third step 504, the focal actuator 37 is activated such as to regain focus ($34^3$) and to maintain focus. The focal control signal is sampled (step 505) over at least one revolution of the optical disc 2, and the sampled values are stored in a memory, in correlation to the angular position at which the focal control signal was sampled.

In a fourth step 506, the objective lens 34 is brought back to the initial focus position $(x_0,0,z_0,\psi_0)$.

In a fifth step 507, the pivot actuator 41 is activated such as to pivot the objective lens 34 over a second angle $\Delta\psi_2$ towards larger radius, to reach a position ($34^4$) having coordinates $(x_0,0,z_0,\psi_0+\Delta\psi_2)$. In a sixth step 508, the focal actuator 37 is activated such as to regain focus ($34^5$) and to maintain focus. The focal control signal is sampled (step 509) over at least one revolution of the optical disc 2, and the sampled values are stored in a memory, in correlation to the angular position at which the focal control signal was sampled.

Along a circle at radius Ri, the tilt $\theta_j(Ri,\phi_j)$ can now be calculated (step 510) for different angular coordinates $\phi_j$.

Referring to the second implementation explained above with reference to FIG. 4, and to the flow chart of FIG. 5B, the optical disc 2 is rotated (step 521) at a certain predetermined speed. Then, in a first step 522, the objective lens 34 is brought to an initial focus position ($34^1$) ($x_0,0,z_0,\psi_0$) corresponding to measuring radius Ri.

In a second step 523, the focal actuator 37 is activated such as to axially displace the objective lens 34 over a distance $\Delta z$ towards the disc, to reach a position ($34^2$) having coordinates ($x_0,0,z_0+\Delta z,\psi_0$). By such step, the beam is now out of focus. In a third step 524, the pivot actuator 41 is activated such as to pivot the objective lens 34 towards smaller radius, to regain focus ($34^3$), and to maintain focus. The pivot control signal is sampled (step 525) over at least one revolution of the optical disc 2, and the sampled values are stored in a memory, in correlation to the angular position at which the pivot control signal was sampled.

In a fourth step 526, the pivot actuator 41 is activated such as to pivot the objective lens 34 towards larger radius, to regain focus ($34^4$), and to maintain focus. The pivot control signal is sampled (step 527) over at least one revolution of the optical disc 2, and the sampled values are stored in a memory, in correlation to the angular position at which the pivot control signal was sampled.

Along a circle at radius Ri, the tilt $\theta_j(Ri,\phi_j)$ can now be calculated (step 530) for different angular coordinates $\phi_j$.

Usually, the objective lens 34 is a symmetrical lens, and usually, in the case of a symmetrical lens, the tilt correction is optimal if the optical axis or main axis of the lens is directed substantially perpendicular to the reflecting layer of the disc, i.e. if the optical axis of the lens makes a pivot angle $\psi$ equal to the tilt $\theta$ of the disc 2. For such cases, tilt correction can be achieved without needing to know the magnitude of the tilt. Likewise, for such cases it is relatively easily possible to check whether the objective lens has an adequate tilt correction position without needing to know the magnitude of the tilt and even without needing to know the current magnitude of the pivot angle.

In the above discussions with reference to FIGS. 3 and 4, and FIGS. 5A–B, the initial pivot angle in the initial focus position of the objective lens has been indicated as $\psi_0$. Starting from a normal situation, the initial pivot angle $\psi_0$ will normally be zero, as illustrated in FIGS. 3 and 4. However, the value of the initial pivot angle $\psi_0$ is not of great importance when calculating the tilt angle $\theta$ in accordance with the method proposed by the invention and discussed above.

On the other hand, if the initial pivot angle $\psi_0$ is equal to the tilt angle $\theta$, the pivot angles $\Delta\psi_1$ and $\Delta\psi_2$ are equal to each other (see FIG. 4), or the axial displacements $\Delta Z_1$ and $\Delta Z_2$ are equal to each other if the pivot angles $\Delta\psi_1$ and $\Delta\psi_2$ are chosen equal to each other (see FIG. 3), as can easily be seen.

Based on this recognition, the present invention also proposes a method for setting the objective lens 34 at an adequate pivot angle suitable for correcting tilt, as will be explained with reference to FIGS. 6A–B. It is noted that the disc may be rotated, but may also be left stationary.

First, a pivot offset $\psi_0$ is selected (step 601), and the objective lens 34 is brought to a focus condition (step 602). Then, as discussed with reference to FIG. 3, the objective lens 34 is pivoted (step 603) over a first angle $\Delta\psi_1$ and axially displaced (step 604) over a first axial distance $\Delta Z_1$ such as to regain focus, and this first axial distance $\Delta Z_1$ is stored (step 605) in a memory. Subsequently the objective lens 34 is pivoted (step 607) over a second angle $\Delta\psi_2$ equal but opposite to the first angle $\Delta\psi_1$, and axially displaced (step 608) over a second axial distance $\Delta Z_2$ such as to regain focus, and this second axial distance $\Delta Z_2$ is stored (step 609) in a memory. These two axial distances $\Delta Z_1$ and $\Delta Z_2$ are compared (step 610) to each other. If the pivot offset $\psi_0$ corresponds to the tilt, said two axial distances $\Delta Z_1$ and $\Delta Z_2$ will be equal to each other. If said two axial distances $\Delta Z_1$ and $\Delta Z_2$ are not, within certain limits, equal to each other, the pivot offset $\psi_0$ is readjusted (step 611), and the above steps 602–609 are repeated until said two axial distances $\Delta Z_1$ and $\Delta Z_2$ are substantially equal to each other. Then, the current value of the pivot offset $\psi_0$ will be taken as operational pivot angle $\psi_C$ (step 612). It is noted that in this method it is not necessary to calculate $\theta$, and it is not necessary to know the focal distance f.

An alternative procedure, equally advantageous, is proposed on the basis of the method discussed with reference to FIGS. 4 and 5B. First, a pivot offset $\psi_0$ is selected (step 621), and the objective lens is brought to a focus condition (step 622). Then, the objective lens 34 is axially displaced (step 623) over a certain axial distance $\Delta Z$. The objective lens 34 is pivoted (step 624) over a first angle $\Delta\psi_1$ such as to regain focus, and this first angle $\Delta\psi_1$ is stored (step 625) in a memory. Subsequently, the objective lens 34 is pivoted (step 626) over a second angle $\Delta\psi_2$ opposite to the first angle $\Delta\psi_1$, such as to regain focus, and this second angle $\Delta\psi_2$ is stored (step 627) in a memory. These two axial angles $\Delta\psi_1$ and $\Delta\psi_2$ are compared (step 630) to each other. If the pivot offset $\psi_0$ corresponds to the tilt, said two angles $\Delta\psi_1$ and $\Delta\psi_2$ will be equal to each other. If said two axial angles $\Delta\psi_1$ and $\Delta\psi_2$ are not, within certain limits, equal to each other, the pivot offset $\psi_0$ is readjusted (step 631), and the above steps 623–627 are repeated until said two angles $\Delta\psi_1$ and $\Delta\psi_2$ are substantially equal to each other. Then, the current value of the pivot offset $\psi_0$ will be taken as operational pivot angle $\psi_C$ (step 632). It is noted that in this method, too, it is not necessary to calculate $\theta$, and it is not necessary to know the focal distance f.

Also, during operation of an optical disc drive apparatus, it may be that the signal quality deteriorates. One of the possible causes may be that the disc has a tilt which does not correspond to the tilt correction setting of the objective lens. According to the present invention, this can be checked relatively easily. The current pivot angle of the objective lens is taken as initial pivot angle $\psi_0$, and the above-discussed steps 603–609 or 623–627, respectively, are taken. The result of step 610 or 630, respectively, determines whether the current pivot angle corresponds to an adequate tilt correction, or, conversely, whether the disc has obtained a tilt deviating from the current pivot angle. If necessary, the pivot angle is adjusted (step 611 or 631, respectively), and the pivot angle setting procedure discussed above is followed.

An important advantage of this method is that the radial coordinate $x_0$ of the objective lens is maintained.

As mentioned above, usually, the objective lens 34 is positioned for optimal tilt correction if the optical axis or main axis of the lens is directed substantially perpendicular to the reflecting layer of the disc, i.e. if the operational pivot angle $\psi_C$ is equal to the tilt $\theta$ of the disc 2. However, this is not necessarily always true. It may be that, for optimal tilt correction, the operational pivot angle $\psi_C$ should be different from the tilt $\theta$ of the disc 2. Whether this will be the case or not, depends on the type of lens, and is known in advance. Further, it will be possible for the manufacturer of the disc drive apparatus to determine in advance an optimal relationship between the operational pivot angle $\psi_C$ and the tilt $\theta$ of the disc 2. This relationship can be stored in a memory associated with the control unit 90, for instance in the form of a look-up table.

Then, after the tilt $\theta$ has been determined by any of the above-mentioned methods, the control unit 90 may set the operational pivot angle $\psi_C$ of the objective lens 34 in accordance with the relationship stored in said memory.

In the situation discussed above where it is desired to check whether the disc has a tilt which does not correspond to the tilt correction setting of the objective lens, for instance because the signal quality has deteriorated, the initial pivot angle $\psi_0$ is set on the basis of the current pivot angle of the objective lens taking said relationship stored in said memory into account.

It should be clear to a person skilled in the art that the present invention is not limited to the exemplary embodiments discussed above, but that various variations and modifications are possible within the protective scope of the invention as defined in the appending claims.

For instance, it is possible that the laser 31 and the detector 35 are mounted with respect to the frame 3.

The invention claimed is:

1. In an optical disc drive apparatus, of a type comprising:
rotating means defining a rotating axis for an optical disc;
optical scanning means for scanning an optical disc with a light beam, said optical scanning means comprising a displaceable objective lens for focussing the light beam onto said optical disc, said objective lens being displaceable in axial direction and capable of being pivoted about an axis directed in tangential direction;
a method for measuring tilt in a measuring location of the optical disc;
the method comprising the steps of:
by pivoting and axially displacing the objective lens, bringing said objective lens to a first focus measuring location such as to focus the light beam in a first anchor point having substantially the same angular coordinate $\phi$ as said measuring location and having a small radial distance $\Delta r1$ from said measuring location;
by displacing and pivoting the objective lens, bringing said objective lens to a second focus measuring location such as to focus the light beam in a second anchor point having substantially the same angular coordinate $\phi$ as said measuring location and having a small radial distance $\Delta r2$ from said measuring location;
said first and second anchor points being located on opposite sides of said measuring location;
the method further comprising the step of calculating tilt in said measuring location from the coordinates of said two focus measuring locations of said objective lens.

2. Method according to claim 1, comprising the steps of:
bringing the objective lens to an initial focus position such as to focus the light beam in said measuring location;
with respect to said initial focus position, pivoting the objective lens over a first angle towards smaller radius;
displacing the objective lens axially over a first axial distance such that the optical beam is again focused on the disc;
with respect to said initial focus position, pivoting the objective lens over a second angle towards larger radius;
displacing the objective lens axially over a second axial distance such that the optical beam is again focused on the disc.

3. Method according to claim 2, wherein tilt of the measuring location is calculated in accordance with the formula:

$$\tan\theta(r,\phi)=(f\cdot\cos(\Delta\psi_1)+\Delta z_1-(f\cdot\cos(\Delta\psi_2)-\Delta z_2))/(f\cdot\sin(\Delta\psi_1)+f\cdot\sin(\Delta\psi_2)).$$

4. Method according to claim 2, wherein the first angle is equal to the second angle.

5. Method according to claim 1, comprising the steps of:
bringing the objective lens to an initial focus position such as to focus the light beam in said measuring location;
with respect to said initial focus position, axially displacing the objective lens over an axial distance towards the disc;
pivoting the objective lens over a first pivot angle towards smaller radius such that the optical beam is again focused on the disc;
pivoting the objective lens over a second pivot angle towards larger radius such that the optical beam is again focused on the disc.

6. Method according to claim 5, wherein tilt of the measuring location is calculated in accordance with the formula:

$$\tan\theta(r,\phi)=(\cos(\Delta\psi_1)-\cos(\Delta\psi_2))/(\sin(\Delta\psi_1)+\sin(\Delta\psi_2)).$$

7. Method according to claim 1, wherein the measurements are performed while the disc is being rotated, such that measurement results are obtained for a plurality of points located at a first radius, and these measurement results are stored in a memory in correlation to the corresponding angular coordinate; measurement results are obtained for a plurality of points located at a second radius, and these measurement results are stored in a memory in correlation to the corresponding angular coordinate; and the tilt at at least one location at an intermediate radius and having a certain angular coordinate is calculated from the measurement results stored in said memories.

8. Optical disc drive apparatus, comprising:
rotating means defining a rotating axis for an optical disc;
optical scanning means for scanning an optical disc with a light beam, said optical scanning means comprising:
a light beam generating means for generating a light beam;
a displaceable objective lens for focussing the light beam onto said optical disc;
the apparatus further comprising:
radial actuator means for radially displacing said objective lens;
axial actuator means for axially displacing said objective lens;
pivot actuator means for pivoting said objective lens;
control means for controlling said radial actuator means, said axial actuator means, and said pivot actuator means;
said control means being designed for measuring tilt in a measuring location of an optical disc by:
by pivoting and axially displacing the objective lens, bringing said objective lens to a first focus measuring location such as to focus the light beam in a first anchor point having substantially the same angular coordinate $\phi$ as said measuring location and having a small radial distance $\Delta r1$ from said measuring location;
by pivoting and axially displacing the objective lens, bringing said objective lens to a second focus measuring location such as to focus the light beam in a second anchor point having substantially the same angular coordinate $\phi$ as said measuring location and having a small radial distance $\Delta r2$ from said measuring location, said first and second anchor points being located on opposite sides of said measuring location;
calculating tilt in said measuring location from the coordinates of said two focus measuring locations of said objective lens.

9. Disc drive apparatus according to claim 8, wherein said control means is designed to:
   activate said radial actuator means and said axial actuator means in order to bring the objective lens to an initial focus position such as to focus the light beam in said measuring location;
   activate said pivot actuator means in order to pivot the objective lens over a first pivot angle towards smaller radius with respect to said initial focus position;
   activate said axial actuator means in order to axially displace the objective lens over a first axial distance such that the optical beam is again focused on the disc;
   activate said pivot actuator means in order to pivot the objective lens over a second pivot angle towards larger radius with respect to said initial focus position;
   activate said axial actuator means in order to axially displace the objective lens over a second axial distance such that the optical beam is again focused on the disc.

10. Apparatus according to claim 9, wherein said control means is designed to calculate tilt of the measuring location in accordance with the formula:

$$\tan\theta(r,\phi) = (f \cdot \cos(\Delta\psi_1) + \Delta z_1 - (f \cdot \cos(\Delta\psi_2) - \Delta z_2))/(f \cdot \sin(\Delta\psi_1) + f \cdot \sin(\Delta\psi_2)).$$

11. Apparatus according to claim 9, wherein the first angle is equal to the second angle.

12. Disc drive apparatus according to claim 8, wherein said control means is designed to:
   activate said radial actuator means and said axial actuator means in order to bring the objective lens to an initial focus position such as to focus the light beam in said measuring location;
   activate said axial actuator means in order to axially displace the objective lens over an axial distance towards the disc;
   activate said pivot actuator means in order to pivot the objective lens over a first pivot angle towards smaller radius such that the optical beam is again focused on the disc;
   activate said pivot actuator means in order to pivot the objective lens over a second pivot angle towards larger radius such that the optical beam is again focused on the disc.

13. Disc drive apparatus according to claim 12, wherein said control means is designed to calculate tilt of the measuring location in accordance with the formula:

$$\tan\theta(r,\phi) = (\cos(\Delta\psi_1) - \cos(\Delta\psi_2))/(\sin(\Delta\psi_1) + \sin(\Delta\psi_2)).$$

14. Apparatus according to claim 8, wherein the control unit is designed to:
   activate the rotating means such as to rotate the disc;
   activate said radial actuator means in order to bring the objective lens to an initial radial position;
   activate said axial actuator means in order to bring the objective lens to an initial focus position;
   activate said pivot actuator such as to pivot the objective lens over a first angle towards smaller radius;
   activate said axial actuator means in order to obtain and maintain a focus condition;
   sample the focal control signal over at least one revolution of the optical disc;
   store the sampled values in a memory, in correlation to the angular position at which the focal control signal was sampled;
   activate said pivot actuator such as to pivot the objective lens over a second angle towards larger radius;
   activate said axial actuator means in order to obtain and maintain a focus condition;
   sample the focal control signal over at least one revolution of the optical disc;
   store the sampled values in a memory, in correlation to the angular position at which the focal control signal was sampled;
   calculate the tilt at a location at said initial radius, using the stored values.

15. Apparatus according to claim 8, wherein the control unit is designed to:
   activate the rotating means such as to rotate the disc;
   activate said radial actuator means in order to bring the objective lens to an initial radial position;
   activate said axial actuator means in order to bring the objective lens to an initial focus position;
   activate said axial actuator means in order to axially displace the objective lens over a distance towards the disc;
   activate said pivot actuator in a first direction in order to obtain and maintain a focus condition;
   sample the pivot control signal over at least one revolution of the optical disc;
   store the sampled values in a memory, in correlation to the angular position at which the pivot control signal was sampled;
   activate said pivot actuator in a second direction in order to obtain and maintain a focus condition;
   sample the pivot control signal over at least one revolution of the optical disc;
   store the sampled values in a memory, in correlation to the angular position at which the pivot control signal was sampled;
   calculate the tilt at a location at said initial radius, using the stored values.

16. In an optical disc drive apparatus, of a type comprising:
   rotating means defining a rotating axis for an optical disc;
   optical scanning means for scanning an optical disc with a light beam, said optical scanning means comprising a displaceable objective lens for focussing the light beam onto said optical disc, said objective lens being displaceable in axial direction and capable of being pivoted about an axis directed in tangential direction;
   a method for setting an operational pivot angle of the objective lens;
   the method comprising the steps of:
   [a] selecting an initial pivot offset;
   [b] bringing the objective lens to an initial focus position $(x_0, 0, z_0, \Psi_0)$;
   [c] with respect to said initial focus position $(x_0, 0, z_0, \Psi_0)$, pivoting the objective lens over a first angle towards smaller radius to a position $(x_0, 0, z_0, \Psi_0 - \Delta\psi_1)$;
   [d] displacing the objective lens axially over a first axial distance such that the optical beam is again focused on the disc;
   [e] with respect to said initial focus position $(x_0, 0, z_0, \Psi_0)$, pivoting the objective lens over a second angle towards larger radius to a position $(x_0, 0, z_0, \Psi_0 + \Delta\psi_2)$, wherein the second angle is equal to said first angle;
   [f] displacing the objective lens axially over a second axial distance such that the optical beam is again focused on the disc;
   [g] comparing said first axial distance with said second axial distance;

[h1] if said first axial distance is not, within a certain limit, substantially equal to said second axial distance, readjust the pivot offset and repeat steps [b]–[g];

[h2] if said first axial distance is substantially equal to said second axial distance, set the operational pivot angle of the objective lens on the basis of the current value of the pivot offset.

17. In an optical disc drive apparatus, of a type comprising:
rotating means defining a rotating axis for an optical disc;
optical scanning means for scanning an optical disc with a light beam, said optical scanning means comprising a displaceable objective lens for focussing the light beam onto said optical disc, said objective lens being displaceable in axial direction and capable of being pivoted about an axis directed in tangential direction;
a method for setting an operational pivot angle of the objective lens;
the method comprising the steps of:
[a] selecting an initial pivot offset;
[b] bringing the objective lens to an initial focus position $(x_0, 0, z_0, \Psi_0)$;
[c] with respect to said initial focus position $(x_0, 0, z_0, \Psi_0)$, axially displacing the objective lens over an axial distance towards the disc;
[d] pivoting the objective lens over a first pivot angle towards smaller radius to a position $(x_0, 0, z_0, \Psi_0-\Delta\psi_1)$, such that the optical beam is again focused on the disc;
[e] pivoting the objective lens over a second pivot angle towards larger radius to a position $(x_0, 0, z_0, \Psi_0+\Delta\psi_2)$ such that the optical beam is again focused on the disc;
[f] comparing said first pivot angle with said second pivot angle;
[g1] if said first pivot angle is not, within a certain limit, substantially equal to said second pivot angle, readjust the pivot offset and repeat steps [b]–[f];
[g2] if said first pivot angle is substantially equal to said second pivot angle, set the operational pivot angle of the objective lens on the basis of the current value of the pivot offset.

18. Method according to claim 16, wherein the operational pivot angle of the objective lens is set to be equal to the current value of the pivot offset.

19. Method according to claim 16, wherein the operational pivot angle of the objective lens is set on the further basis of an optimal relationship between the operational pivot angle and the tilt of the disc.

20. Optical disc drive apparatus, comprising:
rotating means defining a rotating axis for an optical disc;
optical scanning means for scanning an optical disc with a light beam, said optical scanning means comprising:
a light beam generating means for generating a light beam;
a displaceable objective lens for focussing the light beam onto said optical disc;
the apparatus further comprising:
radial actuator means for radially displacing said objective lens;
axial actuator means for axially displacing said objective lens;
pivot actuator means for pivoting said objective lens;
control means for controlling said radial actuator means, said axial actuator means, and said pivot actuator means;
said control means being designed for setting an operational pivot angle of the objective lens by:

[a] selecting an initial pivot offset;
[b] activating said radial actuator means and said axial actuator means in order to bring the objective lens to an initial focus position $(x_0, 0, z_0, \Psi_0)$;
[c] activating said pivot actuator means in order to pivot the objective lens over a first pivot angle towards smaller radius to a position $(x_0, 0, z_0, \Psi_0-\Delta\psi_1)$;
[d] activating said axial actuator means in order to axially displace the objective lens over a first axial distance such that the optical beam is again focused on the disc;
[e] activating said pivot actuator means in order to pivot the objective lens over a second pivot angle towards larger radius to a position $(x_0, 0, z_0, \Psi_0+\Delta\psi_2)$, wherein the second angle is equal to said first angle;
[f] activating said axial actuator means in order to axially displace the objective lens over a second axial distance such that the optical beam is again focused on the disc
[g] comparing said first axial distance with said second axial distance;
[h1] if said first axial distance is not, within a certain limit, substantially equal to said second axial distance, readjust the pivot offset and repeat steps [b]–[g];
[h2] if said first axial distance is substantially equal to said second axial distance, set the operational pivot angle of the objective lens on the basis of the current value of the pivot offset.

21. Optical disc drive apparatus, comprising:
rotating means defining a rotating axis for an optical disc;
optical scanning means for scanning an optical disc with a light beam, said optical scanning means comprising:
a light beam generating means for generating a light beam;
a displaceable objective lens for focussing the light beam onto said optical disc;
the apparatus further comprising:
radial actuator means for radially displacing said objective lens;
axial actuator means for axially displacing said objective lens;
pivot actuator means for pivoting said objective lens;
control means for controlling said radial actuator means, said axial actuator means, and said pivot actuator means;
said control means being designed for setting an operational pivot angle of the objective lens by:
[a] selecting an initial pivot offset;
[b] activating said radial actuator means and said axial actuator means in order to bring the objective lens to an initial focus position $(x_0, 0, z_0, \Psi_0)$;
[c] activate said axial actuator means in order to axially displace the objective lens over an axial distance towards the disc;
[d] activate said pivot actuator means in order to pivot the objective lens over a first pivot angle towards smaller radius to a position $(x_0, 0, z_0, \Psi_0-\Delta\psi_1)$, such that the optical beam is again focused on the disc;
[e] activate said pivot actuator means in order to pivot the objective lens over a second pivot angle towards larger radius to a position $(x_0, 0, z_0, \Psi_0+\Delta\psi_2)$ such that the optical beam is again focused on the disc;

[f] comparing said first pivot angle with said second pivot angle;

[g1] if said first pivot angle is not, within a certain limit, substantially equal to said second pivot angle, readjust the pivot offset and repeat steps [b]–[f];

[g2] if said first pivot angle is substantially equal to said second pivot angle, set the operational pivot angle of the objective lens on the basis of the current value of the pivot offset.

\* \* \* \* \*